Patented Oct. 23, 1951

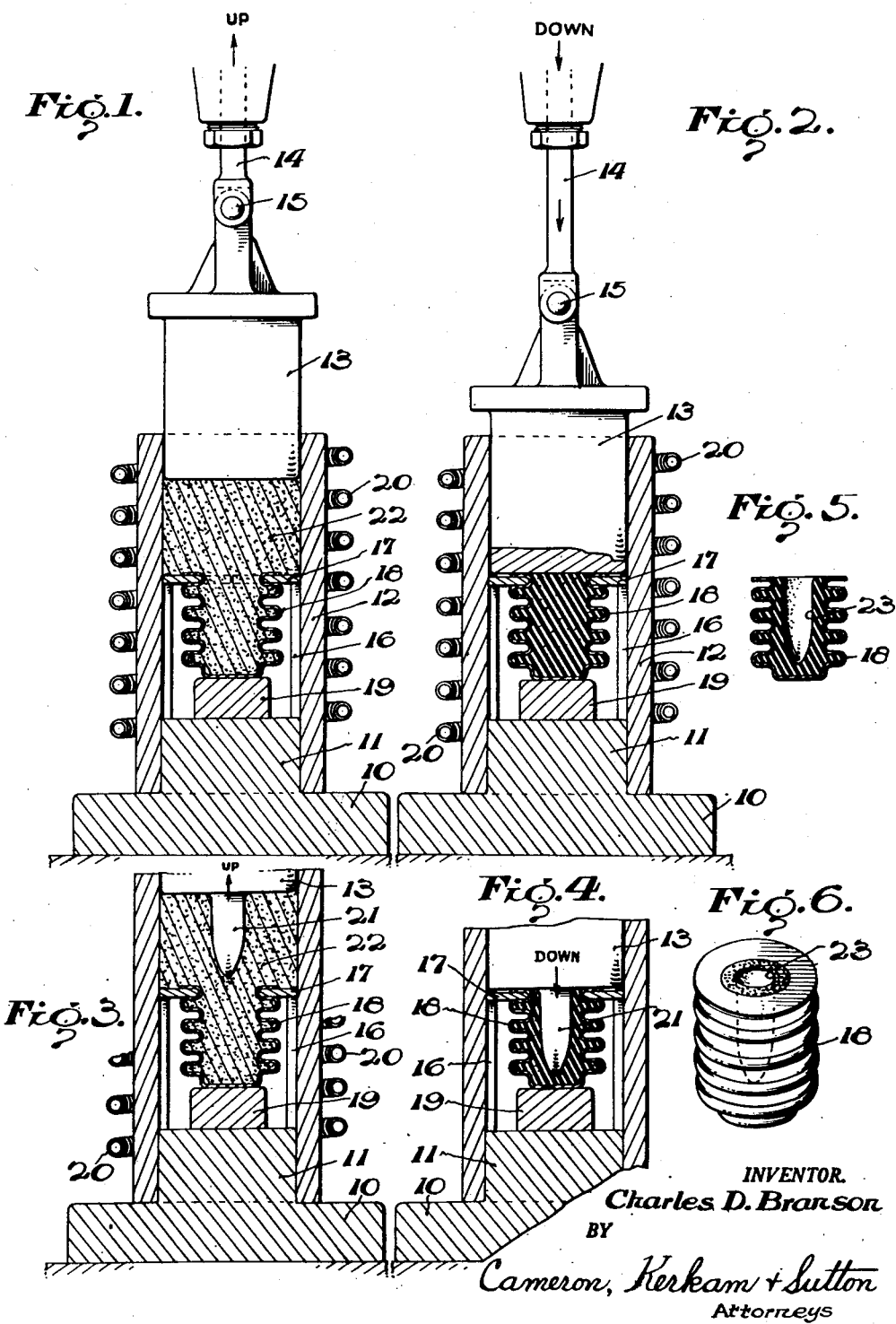

2,572,438

UNITED STATES PATENT OFFICE 2,572,438

FILLING CORRUGATED VESSELS WITH RUBBER

Charles D. Branson, Knoxville, Tenn., assignor to Robertshaw-Fulton Controls Company, Knoxville, Tenn., a corporation of Delaware Application November 17, 1947, Serial No. 786,447

2 Claims. (Cl. 18—59)

This invention relates to methods for filling expansible and contractible corrugated vessels with rubber.

Rubber filled expansible and contractible corrugated vessels have heretofore been proposed for use in devices in which small displacement of the corrugated vessel is required and the corrugated vessel is subject to external forces which might otherwise permanently distort or rupture the vessel. Much difficulty has heretofore been experienced in filling the corrugated vessel uniformly and completely with rubber, avoiding the formation of voids or pockets in the rubber, as is necessary to insure equal displacement of such vessels under equal pressures.

I have found that the previous difficulties experienced in filling corrugated vessels with rubber can be overcome by introducing the rubber into the corrugated vessel in powdered form and with gentle vibration of the vessel to fill the folds of the corrugations with powdered rubber. Thereafter additional powdered rubber is introduced into the corrugated vessel, and heat and pressure are then applied to the entire mass of powdered rubber to force the same, first in semi-molten condition, which term is used herein to mean a condition in which the rubber is sufficiently softened to be flowable under the pressure used and then in molten or fully melted condition, uniformly and completely into the folds of the corrugations of the vessel.

It is accordingly an object of the present invention to provide a novel method for filling corrugated expansible and contractible vessels with rubber.

Another object is to provide such a method in which rubber is introduced into the corrugated vessel in powdered form with vibration of the vessel to fill the corrugations with the powdered rubber.

Another object is to provide such a method in which heat and pressure are applied to the powdered rubber in the corrugated vessel to reduce the powdered rubber to molten form and to force the molten rubber uniformly and completely into the folds of the corrugations.

Another object of this invention is to provide a method as last referred to in which the corrugated vessel is first filled with powdered rubber and thereafter substantial additional quantities of powdered rubber are provided for completing the fill under heat and pressure.

Another object is to provide such a method in which the rubber filling of the corrugated vessel may be automatically provided with a cavity for receiving an operating rod.

Another object is to provide novel apparatus for supporting the corrugated vessel and supplying heat and pressure to the powdered rubber for filling the corrugated vessel.

Other and further objects of the preesnt invention will appear from the following description.

The novel method of my invention may be carried out by various manual and mechanical means and the novel apparatus which I employ in carrying out this method is capable of many mechanical embodiments. Two embodiments of suitable apparatus for carrying out my invention are illustrated in the accompanying drawings and will be described hereinafter for the purposes of illustrating my invention. It is to be expressly understood, however, that these embodiments are shown in the drawings and are described hereinafter for the purposes of illustration only, and that they are not to be construed as defining or limiting the present invention. Reference should therefore be had to the appended claims to determine the scope of this invention.

In the accompanying drawings, in which like reference characters designate like parts, Fig. 1 is a somewhat schematic cross sectional elevation of suitable apparatus for carrying out the method of my invention showing the corrugated vessel filled with powdered rubber before and pressure are applied to the powdered rubber;

Fig. 2 is a view similar to that of Fig. 1 and showing the position of the several parts of the apparatus after heat and pressure have been applied to the powdered rubber;

Fig. 3 is a partial cross sectional elevation of another embodiment of suitable apparatus for carrying out my invention which includes means for casting a cavity in the rubber filling of the corrugated vessel;

Fig. 4 is a view of the embodiment of Fig. 3 with the cavity forming means in cavity forming position within the corrugated vessel;

Fig. 5 is a cross sectional view of a corrugated vessel filled with rubber by the method of the present invention showing a cavity formed in the rubber filling to receive an operating rod; and Fig. 6 is a view of a corrugated vessel as seen from above filled with rubber by the method of the present invention.

Referring particularly to Figures 1 and 2 the apparatus there shown comprises a base 10 provided with a cylindrical upstanding member 11. A cylinder 12 rests upon base 10 and surrounds member 11. A ram 13 is mounted for reciprocating movement in cylinder 12 and forms a close sliding fit therewith. Ram 13 is reciprocated by a piston (not shown) which drives piston rod 14 pivotally coupled to ram 13 at 15. A tubular support 16 is mounted within cylinder 12 and supports a split ring 17 which is seated in the upper corrugation of and surrounds the corrugated expansible and contractible vessel 18 to be filled with rubber. The bottom of corrugated vessel 18 may be supported within cylinder 12 in any suitable way, as by an anvil 19. Cylinder 12 is surrounded by any suitable heating means 20 for heating the powdered rubber. Said heating means 20 may comprise steam coils, electric resistance heating elements or other suitable heating means as may be most convenient and suitable.

In Figs. 3 and 4 ram 13 is provided with a downwardly depending cavity-forming element 21 which is designed to enter corrugated vessel 18 on the downward stroke of ram 13 to form a cavity in the rubber filling of vessel 18.

When it is desired to use this apparatus split ring 17 is inserted in the uppermost corrugation of vessel 18 and vessel 18 is filled with powdered rubber. During filling of vessel 18 it should be vibrated to force as much of the powdered rubber as possible into the folds of the corrugations. Thereafter vessel 18 and split ring 17 are inserted into cylinder 12 and slid down into cylinder 12 until split ring 17 rests upon tubular element 16 with the bottom of vessel 18 resting upon anvil 19 so that the vessel is supported at both ends against the pressure to be applied. Powdered rubber is then poured into cylinder 12 as shown at 22. The amount of powdered rubber poured into cylinder 12 should be on the order of twice that already in vessel 18. Heating means 20 are now energized to impart a temperature on the order of 330° F. to the powdered rubber and ram 13 is moved downwardly to exert a pressure upon the powdered rubber on the order of 1000 pounds per square inch. As the powdered rubber becomes heated it first becomes semi-molten, and the pressure exerted by ram 13 forces this semi-molten mass of powdered rubber downwardly into vessel 18. It is important that the temperature and pressure be applied to the powdered rubber at the same time so that the powdered rubber will be in semi-molten condition during the initial stages when it is being forced into vessel 18, as by reason of this semi-molten condition of the powdered rubber air entrapped in the folds of the corrugations of vessel 18 as the rubber is forced into the corrugations can escape and air pockets will not form in the rubber. If the powdered rubber becomes molten before pressure is applied air trapped in the corrugations of vessel 18 cannot escape through the molten rubber and undesirable air pockets and bubbles will be formed in the rubber filling of the corrugated vessel. After any entrapped air has escaped continued heating renders the rubber fluid, and continued pressure applied to the fluid rubber forces the same completely and uniformly into the corrugations of vessel 18.

When vessel 18 cannot properly withstand the pressures required to force the rubber into vessel 18 as just explained vessel 18 must be externally reinforced to withstand such pressure. To provide such reinforcement fluid under pressure or sand or other suitable substance may be introduced into cylinder 12 in surrounding relationship to the vessel 18.

When a cavity is desired in the rubber filling of vessel 18 the embodiment of the apparatus shown in Figs. 3 and 4 may be employed. When cavity forming element 21 is forced downwardly into vessel 18 by ram 13 it not only forms a cavity in the rubber but also assists in forcing the rubber into the corrugations of vessel 18. After the rubber has cooled from its fluid state and has solidified ram 13 is withdrawn and element 21 is carried with ram 13, leaving a cavity in the rubber filling of vessel 18 as shown at 23 in Figs. 5 and 6.

It will now be apparent that by the present invention I have provided a novel method and apparatus for filling expansible and contractible corrugated vessels with rubber in which the corrugated vessel is first filled with powdered rubber during which filling the vessel is vibrated; in which additional powdered rubber is then supplied to the corrugated vessel and the powdered rubber is simultaneously subjected to heat and pressure to reduce the rubber to a semi-molten and then liquid form and to force the same into the corrugations of the corrugated vessel; in which novel means are provided for forming a cavity in the rubber filling of the corrugated vessel when such a cavity is desired for receiving an actuating rod; and in which novel apparatus is provided for supporting the corrugated vessel during filling and for supplying heat and pressure to the powdered rubber.

Changes in or modification of the above described illustrative embodiments of my invention may now be suggested to those skilled in the art without departing from my inventive concept and reference should therefore be had to the appended claims to determine the scope of my invention.

What is claimed is:

1. The method of making a rubber-filled expansible and contractible vessel which has relatively-deep radially-extending corrugations in its peripheral wall which includes the steps of filling the vessel with powdered rubber, vibrating the vessel to compact the powdered rubber therein, positioning the vessel in a container, supplying additional powdered rubber from said container exteriorly of and in communication with said vessel for introduction into the same, applying heat and pressure simultaneously to the entire mass of powdered rubber to soften the same sufficiently to render the rubber flowable under the pressure used, forcing air entrapped in the corrugations out of the same by forcing the rubber in its flowable condition from the exterior of said vessel into the interior thereof, and then continuing the application of heat and pressure to the rubber to complete the melting of the same and force the melted rubber to fill completely the corrugations of said vessel.

2. The method of making a rubber-filled expansible and contractible vessel which has relatively-deep radially-extending corrugations in its peripheral wall which includes the steps of filling the vessel with powdered rubber, positioning said vessel in a container, supporting the vessel in said container against displacement at its opposite ends, supplying additional powdered rubber from said container exteriorly of and in communication with said vessel for introduction into the same, applying heat and pressure simultaneously to the entire mass of powdered rubber to soften the same sufficiently to render the rubber flowable under the pressure used, forcing air entrapped in the corrugations out of the same by forcing the rubber in its flowable condition from the exterior of said vessel into the interior thereof, and then continuing the application of heat and pressure to the rubber to complete the melting of the same and force the melted rubber to fill completely the corrugations of said vessel.

CHARLES D. BRANSON.

REFERENCES CITED

The following references are of record in the file of this patent:

UNITED STATES PATENTS

| Number | Name | Date |
|---|---|---|
| 249,193 | Mallory | Nov. 8, 1881 |
| 760,192 | Gaylord | May 17, 1904 |
| 1,262,368 | Martin | Apr. 9, 1918 |
| 1,683,587 | Doerschuk | Sept. 4, 1928 |
| 1,918,505 | Wallenberg | July 18, 1933 |
| 2,111,418 | Buxbaum | Mar. 15, 1938 |
| 2,131,319 | Greenholtz | Sept. 27, 1938 |
| 2,135,380 | Benge | Nov. 1, 1938 |